United States Patent [19]
Smith

[11] 3,872,234
[45] Mar. 18, 1975

[54] ELECTRICAL CABLE PEDESTAL STRUCTURE

[75] Inventor: Robert L. Smith, Minnetonka, Minn.

[73] Assignee: Roart Plastics, Inc., Hopkins, Minn.

[22] Filed: Feb. 11, 1974

[21] Appl. No.: 441,437

[52] U.S. Cl............... 174/38, 174/50, 220/18, 220/41
[51] Int. Cl............................................. H02g 9/02
[58] Field of Search ......... 174/37, 38, 50, 52 R, 60, 174/75 B, 100; 317/117, 120, 121; 220/3.92, 3.94, 4 F, 18, 41

[56] References Cited
UNITED STATES PATENTS

| | | | |
|---|---|---|---|
| 2,040,003 | 5/1936 | Jorgensen | 220/41 X |
| 2,102,094 | 12/1937 | Romig | 220/41 |
| 2,779,496 | 1/1957 | Henderson | 220/3.92 |
| 3,164,668 | 1/1965 | Skubal | 174/38 UX |
| 3,184,071 | 5/1965 | Delaire | 220/41 X |
| 3,286,133 | 11/1966 | Sturdivan | 317/117 X |
| 3,404,212 | 10/1968 | Mack et al. | 174/38 |
| 3,480,721 | 11/1969 | Baumgartner | 174/38 |
| 3,485,932 | 12/1969 | Van Schaack | 174/38 |
| 3,714,369 | 1/1973 | Bunten | 174/38 |

Primary Examiner—Laramie E. Askin
Attorney, Agent, or Firm—Leo Gregory

[57] ABSTRACT

A pedestal enclosure for an above-ground cable splice of an underground wiring system in which the improvement consists of a ground anchored supporting member having a base cable splice supporting housing portion and an upper housing portion, said portions having such interlocking engagement with said supporting member as to prevent the passage of any sunlight into the interior of said enclosure and to permit ready access to the cable splice.

8 Claims, 7 Drawing Figures

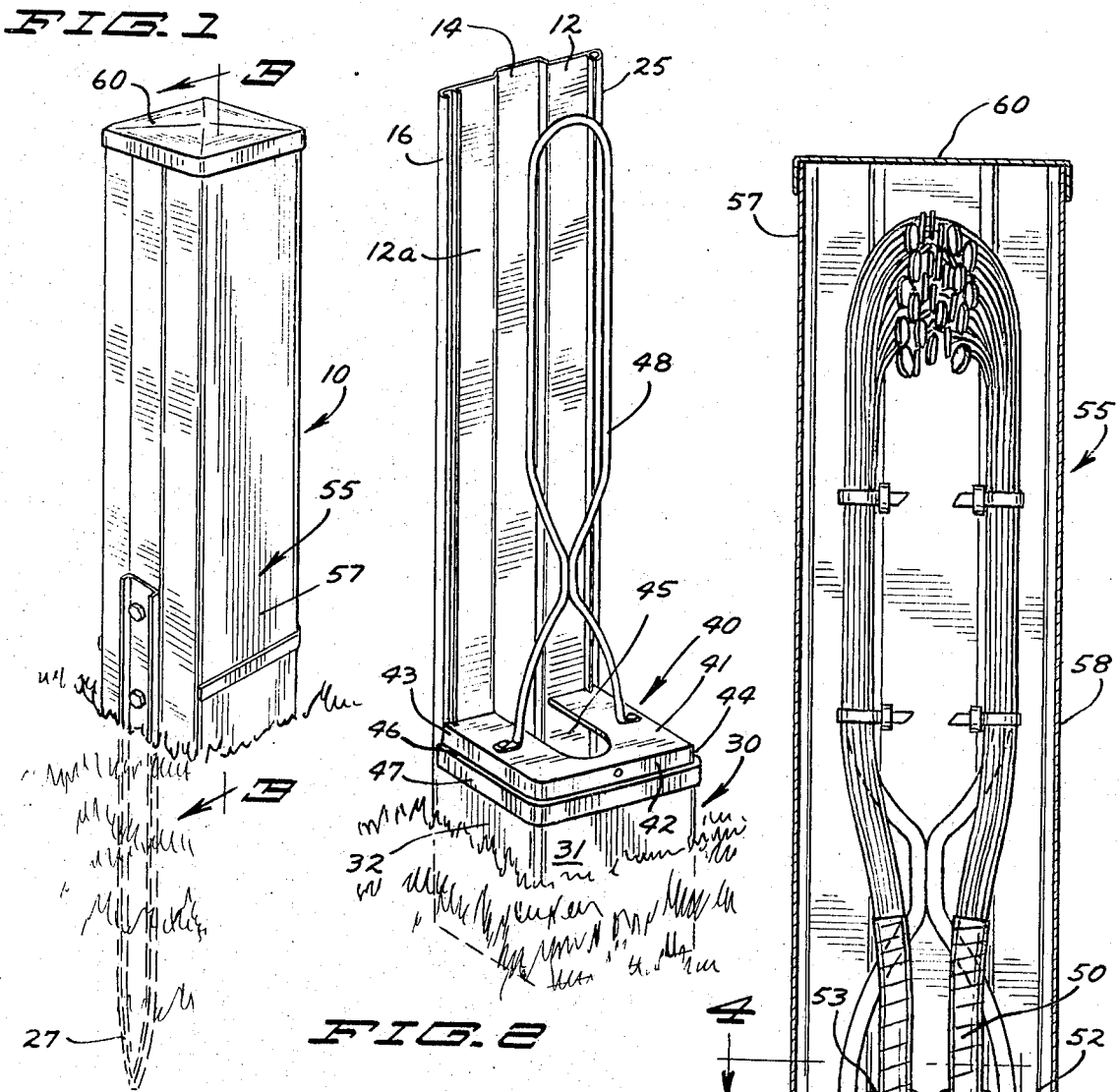
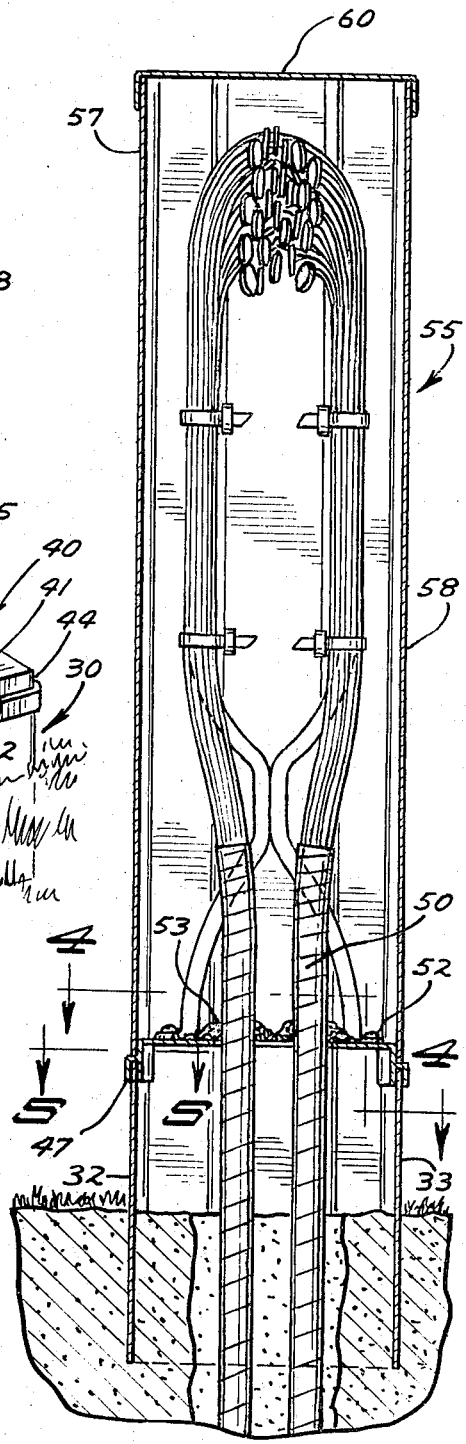
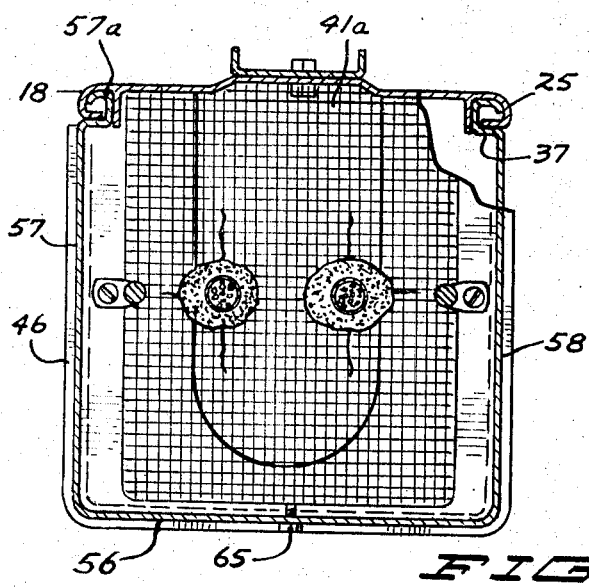

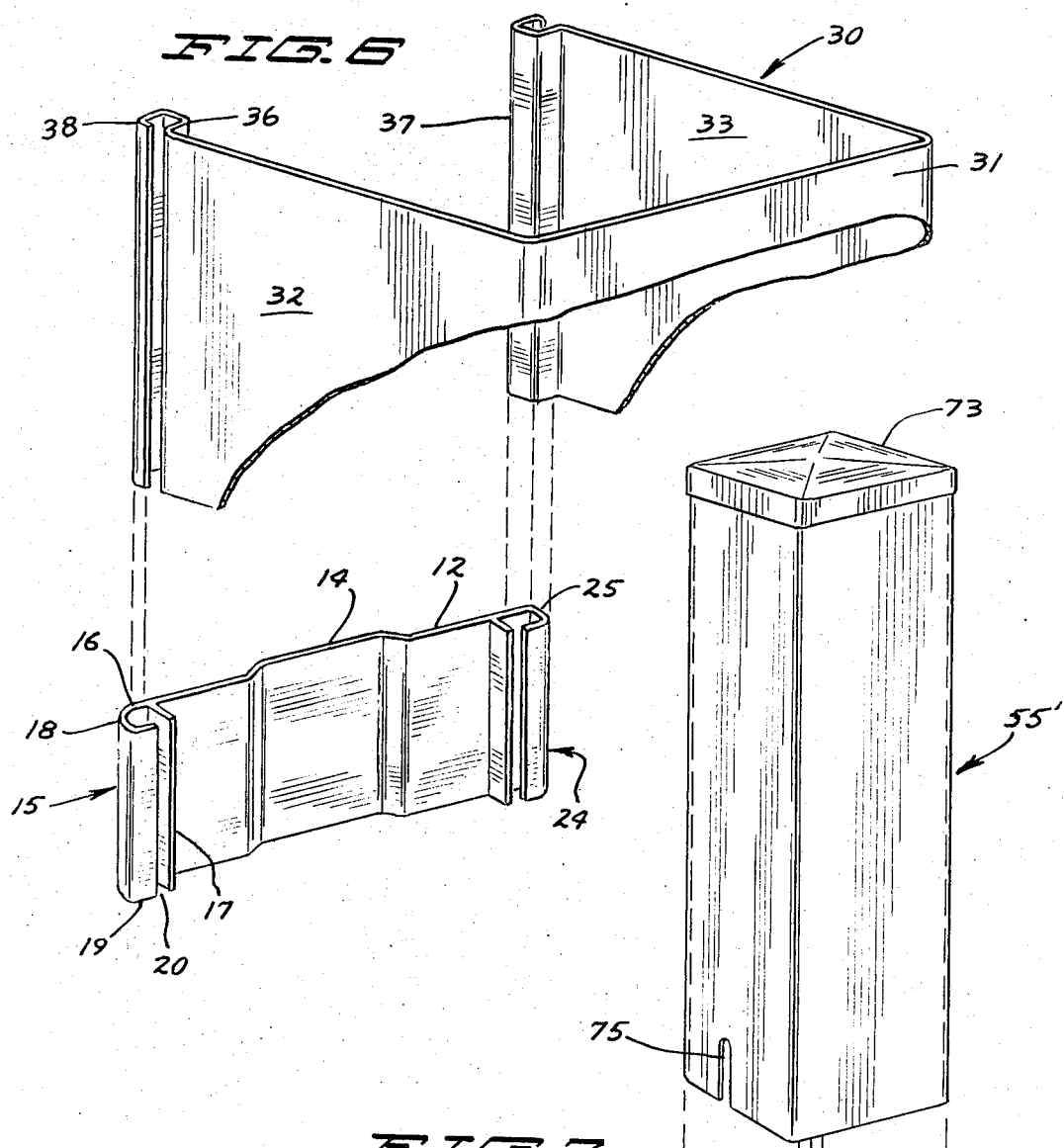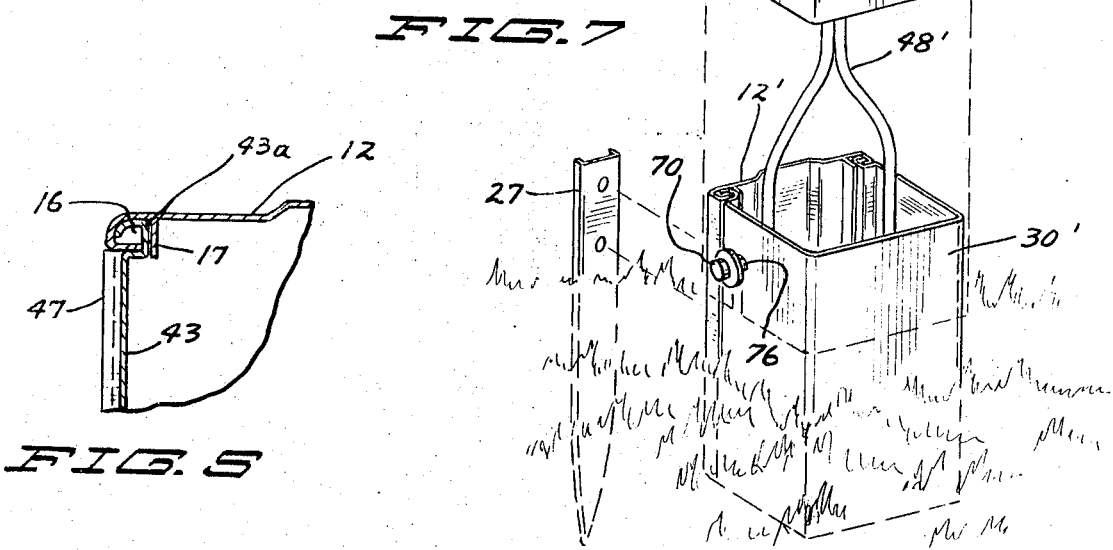

ELECTRICAL CABLE PEDESTAL STRUCTURE

SUMMARY AND BACKGROUND OF THE INVENTION

The invention herein relates to an improvement in an upstanding housing or pedestal enclosure to receive an above ground cable splice of an underground wiring system.

Insulation failure occurs in pedestal enclosures with respect to cable splices due to the insulation on the conductors suffering from oxidative degradation severe enough to have the insulation fall off of the conductors. In repairing such a condition, the rewiring of a cable splice represents expensive maintenance.

One direct cause of oxidative degradation of the insulation of conductors with respect to a cable splice is the contact of such insulation by rays of sunlight coming through knockout holes and cracks which may develop in pedestal enclosures. The incidence of insulation failure is substantial particularly in the southwestern portion of the U.S. where intense sunlight is present. A very small ray of sunlight upon insulation is all that is required for deterioration of the insulation.

It is desirable and a particular object of this invention to provide a pedestal enclosure for a cable splice which enclosure is so constructed as to seal out any possible entry or passage of sunlight through the structure thereof.

It is an object of this invention to provide a pedestal enclosure of which the connected portions thereof have such interlocking engagement as to prevent the passage of sunlight and to prevent the forming of crevices in providing an effectively sealed enclosure.

It is more generally an object of this invention to provide a pedestal enclosure for a cable splice with said enclosure having a ground anchored supporting member, a base housing portion carrying a cable splice support and an upper housing portion, said housing portions and said supporting member having such interlocking engagement as to have an effectively sealed light-proof connection therebetween.

These and other objects and advantages of the invention will be set forth in the following description made in connection with the accompanying drawings in which like reference characters refer to similar parts throughout the several views and in which:

FIG. 1 is a view in perspective of the structure herein;

FIG. 2 is a view in perspective showing a portion of the structure herein;

FIG. 3 is a view on an enlarged scale in vertical section taken on line 3—3 of FIG. 1 as indicated;

FIG. 4 is a view in horizontal section on an enlarged scale taken on line 4—4 of FIG. 3 as indicated;

FIG. 5 is a broken view in horizontal section on an enlarged scale taken on line 5—5 of FIG. 3 as indicated;

FIG. 6 is a broken exploded view in perspective on an enlarged scale showing a detail of structure, and FIG. 7 is an exploded view in perspective of a modification.

DESCRIPTION OF A PREFERRED EMBODIMENT

Referring to the drawings, an above-ground upstanding terminal housing 10 to receive above-ground spliced cable connections of buried or under-ground wiring systems is indicated. Said housing may be suitably made of a fiberglass reinforced polyester and may be readily formed by compression molding.

Said housing comprises a back or support plate 12 here shown having a central vertical outwardly projecting stiffening channel 14.

At the side edge portions 15 and 24 of said back plate are formed grooves 16 and 25. Said grooves are particularly designed to provide a sealed interlocking engagement with cooperating housing portions, hereinafter described, to be supported by said backing plate.

A rib 17 projects from said plate member 12 at right angles thereto spaced inwardly from the edge portion 18 thereof as indicated in FIG. 6. Said edge portion 18 is shown curved through a radius such as of approximately ½ inch to form a corner and has its terminal portion 19 angled inwardly at right angles to said rib 17 and to be spaced therefrom to form a slot 20 therebetween, said slot being on the order of 5/32 inch, which is just slightly more than the thickness of the material used. Thus the groove 16 is formed and the groove 25 is formed in like manner.

Said back or support plate member 12 is secured in operating position by a suitable stake 27 bolted thereto and driven to a sufficient depth into the ground for secure anchorage.

In connection with said supporting plate 12, to be mounted thereon is a base housing member portion 30 having a front wall 31 and disposed at right angles thereto are side walls 32 and 33. Said side walls have their free end portions formed into tongue portions 36 and 37 to be slidingly received into interlocking engagement with said grooves 16 and 25.

Said tongue portion 36 is formed as an inwardly disposed right angled flange having an outwardly curved terminal portion 38 having its curvature corresponding to the radius of said edge portion 18 of groove 16, as shown in FIG. 6, for sliding interlocking engagement therewith, as shown in FIG. 4. Said tongue portion 37 is a mirror image of said tongue portion 36 and has interlocking engagement with the groove 25.

Overlying said base housing member 30 is a cover member 40 having a top wall 41, a front wall 42 and side walls 43 and 44 disposed at right angles to said front wall. Depending from said front and side walls and projecting outwardly therefrom to form a top wall 46 is an inverted U-channel portion forming a flange 47 dimensioned to have a tight fit over the corresponding upper edge portions of said base housing member 30.

Said top wall 41 has its inner end portion 41a designed to conform to the cross sectional configuration of the inner wall surface 12a of said support plate 12 and to have close engagement therewith.

The rear end portions of said side walls 43 and 44 are extended sufficiently to form tongue portions as shown by the rear end portion 43a to correspond in configuration to said tongue portions 36 and 37 for interlocking engagement with said grooves 16 and 25.

Upstanding from said top wall 41 and secured thereto as by conventional bolts is a leg supported loop 48 comprising a splice frame to which a cable splice such as cable splice 50 may be suitably secured.

Centrally of said cover member 40 is an opening 45 through which a cable splice will be passed after which said opening is sealed by overlying the upper surface of said cover member 40 as with a suitable screen mesh 52 which is apertured to accommodate said support frame 48 and the cable splice 50 secured thereto and a suitable mastic sealant 53 is applied over said screen and over the adjacent surface of said top wall 41. Suitable mastic sealants are well known in the art.

Supported on the top wall 46 of said cover member 40 and by said support plate 12 is an upper enclosure or housing portion 55 of the same horizontal cross sectional configuration as that of said base housing member 30 having a front wall 56 and side walls 57 and 58. Said side walls have formed at their free edge portions tongue portions as shown in FIG. 4 by tongue portion 57a of wall 57 which tongue portions correspond in configuration to said tongue portions 36 and 37 for interlocking engagement with said grooves 16 and 25.

Disposed over said upper housing portion 55 and the upper edge portion of said support plate 12 is a lid member 60, here indicated as being integral with said housing portion 55.

Said upper housing member 55 will have a bolt 65 disposed therethrough which may be threaded into the front wall 42 of said cover member 40, which wall may be tapped or apertured to have a nut secured therein as indicated generally in FIG. 4.

MODIFICATION

Referring to FIG. 7, a modification of the embodiment above described is shown in which like portions are indicated by like reference numerals and in which somewhat modified portions are shown by like reference numerals with a prime added.

A support plate member 12' is of the same cross sectional configuration as said support plate 12 except for being substantially shorter in height and it has a stake 27 bolted thereto and driven into the ground for secure anchorage.

Secured to said support plate 12' is a base enclosure member 30' of substantially the same structure and configuration as said base member 30 and the same is secured to said support member 12' in the same manner as said base member 30 is secured to said support plate member 12. Said base member 30' is shown to be of the same height as said support plate 12'.

Upstanding from said base member 30' is a cable splice support 48' having its leg portions appropriately secured by bolts to the respective inner side walls of said base member 30' but not here shown.

Overlying and fitting snugly about the upper portions of said support plate 12' and said base supporting housing member 30' and extending upwardly thereof is an upper housing member 55' forming a complete four-sided enclosure and having a lid 73 sealed to the upper end portion thereof.

Said housing member 55' has an open end slot 75 formed in each side wall at the bottoms thereof, as indicated at 75 in FIG. 7, to receive therein bolts 70 having head portions overlying said side walls. Said bolts are threaded inwardly of said side walls as at 76 to secure said housing member to said base member. Said stake 27 will be positioned to have its upper edge portion in horizontal alignment with said bolts 70 to form a stop for the lower edge portion of said housing member 55'.

OPERATION

After the location point for the pedestal enclosure 10 is selected, sufficient cable slack will be pulled up from the buried cable system to make a cable splice and to mount and secure the same upon the splice support 48.

A sufficient hole is dug into the ground to receive the lower portion of the support plate 12 and of the base support member 30 as illustrated. The stake will be driven into the ground and bolted to said support plate. The cable 50 will be extended upwardly sufficiently through said base member 30. The hole dug will be filled and the ground therein tamped.

The cover member 40 will be mounted onto said support plate 12 and slid down to securely overlie said base member 30. The cable appropriately spliced will be secured to the splice support 48. The sealing screen 52 will overlie said opening 45 and the upper surface of said cover member 40 and will be fitted about the cable splice and the legs of said splice support frame. A mastic sealant member is applied to overlie said screen to completely seal the top surface of said cover member 40 and will also seal the joint between said cover member and the adjacent surface portion of the support plate 12.

The upper housing member 55 is mounted upon the support plate 12 and slid down to seat upon the wall or ledge 46 in a tight, snug fit and the same will be secured by a screw as described.

It is seen that the interlocking engagement of the tongue and grooves as described and the fitting of the upper housing over the cover member 40 and the sealing engagement of said base member 30 with said support plate 12 provide light-proof connections between the various portions forming the pedestal enclosure 10. The connections between said various portions are designed to avoid separation by expansion and contraction resulting from weather and environmental conditions.

Said structure 10 as described effectively prevents insects such as ants, wasps, hornets, spiders and the like from having access to the cable splice from the ground.

The modification described is not believed to require any further description. It provides an effective sealed engagement in which the upper housing portion forms a complete enclosure in contrast to the structure first above described in which the support plate 12 forms one side wall of the total enclosure.

The arrangement as above described in forming an effective light-proof enclosure at the same time permits ready access to the cable splice contained therein.

It will of course be understood that various changes may be made in form, details, arrangement and proportions of the parts without departing from the scope of the invention herein which, generally stated, consists in an apparatus capable of carrying out the objects above set forth, in the parts and combinations of parts disclosed and defined in the appended claims.

What is claimed is

1. A pedestal enclosure to receive an above-ground cable splice of an underground wiring system having in combination an upstanding plate member forming a housing support, an interlocking groove formed along each side of said plate member, a ground anchored means having said plate member secured thereto, a base housing member, a pair of interlocking tongue portions integral with said base housing member and respectively interengaging said grooves, a cable splice support upstanding from said base housing member, an upper housing member carried by said plate member and said base housing member, and means removably securing said upper housing member to said plate member and said base housing member.

2. The structure set forth in claim 1, including a cover member overlying said base housing member, a pair of tongue portions carried by said cover member having interlocking engagement with said grooves, said cover member having an opening therein to receive a cable splice therethrough, and sealing means overlying said cover member.

3. The structure set forth in claim 2, wherein said cover member comprises a depending front wall and side walls, said tongue portions are formed at the free edges of said side walls, and an inverted channel depends from said front and side walls of said cover member, said channel receiving therein the upper edge portion of said base housing member.

4. The structure set forth in claim 1, wherein a pair of tongue portions integral with said upper housing member have interlocking engagement with said grooves.

5. The structure set forth in claim 1, wherein said upper housing member encloses the upper portion of said plate member and said base housing member.

6. The structure set forth in claim 1, wherein said base housing member comprises a front wall and a pair of side walls, and said tongue portions are formed at the free edge portions of said side walls.

7. The structure set forth in claim 1, wherein said plate member extends upwardly of said base housing member, said upper housing member comprises a front and side walls, and said side walls each have a tongue portion at their free ends, said tongue portions respectively interlocking with said grooves at the sides of said plate member.

8. The structure set forth in claim 1, wherein said upper housing member comprises front, rear and side walls and an enclosing top member.

* * * * *